United States Patent [19]

Shoemaker et al.

[11] Patent Number: 4,639,576

[45] Date of Patent: Jan. 27, 1987

[54] WELDING ELECTRODE

[75] Inventors: Lewis E. Shoemaker; Thomas O. Bates, both of Huntington, W. Va.

[73] Assignee: Inco Alloys International, Inc., Huntington, W. Va.

[21] Appl. No.: 871,128

[22] Filed: May 30, 1986

Related U.S. Application Data

[63] Continuation of Ser. No. 714,988, Mar. 22, 1985, abandoned.

[51] Int. Cl.$^4$ ............................................... B23K 35/22
[52] U.S. Cl. ............................ 219/146.23; 219/146.1; 148/127
[58] Field of Search ........... 219/146.1, 146.24, 146.22, 219/146.23, 145.23; 148/127

[56] References Cited

U.S. PATENT DOCUMENTS

| 2,626,339 | 1/1953 | Wasserman | 219/146.22 X |
| 3,181,970 | 5/1965 | Peck et al. | 219/146.22 |
| 4,355,224 | 10/1982 | Mesick et al. | 219/137 WM |
| 4,426,428 | 1/1984 | Kammer et al. | 219/146.31 X |

FOREIGN PATENT DOCUMENTS 46368  2/1982  European Pat. Off. ......... 219/146.1

Primary Examiner—E. A. Goldberg
Assistant Examiner—Catherine Sigda
Attorney, Agent, or Firm—Edward A. Steen; Raymond J. Kenny

[57] ABSTRACT

A consumable electrode including a core wire and a coating adapted for welding clad steel products. The resulting weld deposit overcomes the problem of iron dilution which tends to degrade the weld when available electrodes are utilized. Such clad products are often exposed to sulfur and acidified chloride environments.

6 Claims, No Drawings

WELDING ELECTRODE

This is a continuation of co-pending application Ser. No. 714,988 filed on Mar. 22, 1985, now abandoned.

TECHNICAL FIELD

The instant invention relates to the art of welding in general and more particularly to an electrode especially adapted for welding a nickel-base alloy over steel.

BACKGROUND ART

Nickel-base alloys have long enjoyed considerable usage and are known to possess considerable advantages when employed in high temperature environments such as industrial turbines, flue gas scrubbers, jet engines, petrochemical installations, etc. These nickel alloys exhibit excellent high temperature strength characteristics. Moreover, many nickel-base alloys are highly resistant to corrosion normally associated with a wide variety of hot gases and corrosive liquids.

In particular, for specific applications, INCONEL alloy 625 clad steel offers a substantial cost savings over solid INCONEL alloy 625 while exhibiting comparable corrosion resistance to sulfur and acidified, chloride environments. (INCONEL is a trademark of the INCO family of companies.)

However, when available welding electrodes are deposited on INCONEL alloy 625 clad steel, iron dilution from the steel substrate of the cladding can effectively lower the molybdenum content of the weld deposit to the point where it no longer offers corrosion resistance equivalent to the base metal.

SUMMARY OF THE INVENTION

Accordingly, there is provided a welding electrode that provides a sound weld deposit on clad steel products. Even when diluted with iron from the underlying steel, the welding deposit offers equivalent corrosion resistance to that exhibited by the alloy.

PREFERRED MODE FOR CARRYING OUT THE INVENTION

Assignee of the instant invention manufactures a coated consumable welding electrode called INCONEL Welding Electrode 112. It is employed in shielded metal arc welding operations for joining both nickel-base alloys and carbon steels. However, as alluded to above, this electrode is deficient when welding clad steel.

Compositional data on INCONEL Welding Electrode 112 is shown in Table 1.

TABLE 1

| Chemical Composition, % (Deposited Weld Metal) | | | |
|---|---|---|---|
| Ni[a] | 55.0 max | Si | 0.75 max |
| C | 0.10 max | Cr | 20.0-23.0 |
| Mn | 1.0 max | Cb[b] | 3.15-4.15 |
| Fe | 7.0 max | Mo | 8.0-10.0 |
| S | 0.02 max | P | 0.03 max |
| | | Others | 0.50 max |

[a]Plus Co. Co 0.12 max when specified.
[b]Plus Ta

INCONEL alloy 625 (see U.S. Pat. No. 3,160,500) is a high strength nickel-base alloy resistant to many forms of corrosive attack. Its nominal composition (major components) is given in Table 2.

TABLE 2

| (in weight %) | | | |
|---|---|---|---|
| Ni | balance | Fe | 0-5% |
| Cr | 20-23% | Co | 0-1% |
| Cb + Ta | 3-4% | Si | 0-0.5% |
| Mo | 8-10% | Al | 0-0.4% |
| C | 0-0.1% | Ti | 0-0.4% |

Extensive research was undertaken to develop a consumable welding electrode suitable for welding INCONEL alloy 625 clad steel for use in flue gas desulfurization scrubbers. The aggressive environment in these systems can cause debilitating pitting and crevice corrosion attack. It is accepted that molybdenum is effective for increasing the resistance of nickel-base and iron-base alloys to such attack. Indeed INCONEL alloy 625 and INCONEL alloy 625 clad steel are used in this environment. However, when using weld clad steel, the iron dilution from the steel substrate of the clad product lowers the molybdenum content of the weld to the point that it no longer exhibits corrosion resistance equivalent to the base material. Accordingly, different electrode formulations were considered.

As a result of extensive testing, Table 3 lists the chemical composition requirements for undiluted weld metal. An electrode depositing the following weld compositional ranges has been found to successfully weld INCONEL alloy 625 clad steel.

TABLE 3

| Element | Weight % | |
|---|---|---|
| | Min | Max |
| C | 0 | 0.10 |
| Mn | 0 | 1.0 |
| Fe | 0 | 7.0 |
| P | 0 | 0.03 |
| S | 0 | 0.02 |
| Si | 0 | 0.80 |
| Cu | 0 | 0.50 |
| Ni | 52.0 | Balance |
| Cr | 20.0 | 23.0 |
| Cb + Ta | 0 | 4.20 |
| Mo | 11.0 | 13.0 |

The instant consumable electrode essentially utilizes INCONEL alloy 625 as the core wire and the flux formulation as shown in Table 4. The flux is formulated and deposited on the core wire in the usual manner.

TABLE 4

| Dry Mix (all in weight %) | Range | Preferred |
|---|---|---|
| Calcium Carbonate | 12-40 | 23 |
| Cryolite | 10-35 | 21 |
| Titanium Dioxide | 10-30 | 14 |
| Magnetite | 0-10 | 3 |
| Molybdenum Powder | 6-12 | 10 |
| Nickel-Columbium Powder | 0-7 | up to 7 |
| Chromium Powder | 0-10 | 8 |
| Nepheline Syenite | 0-15 | 8 |
| Zirconium Oxide | 0-5 | 1 |
| Periclase | 0-5 | 2 |
| Bentonite (extrusion aid) | 0-5 | 3 |
| Alginate (extrusion aid) | 0-5 | 0.5 |
| Natrosol (extrusion aid) | 0-5 | 0.25 |
| Binder (% of weight of Dry Mix above) | | |
| Sodium Silicate | 10-30 | 24 |
| Lithium Silicate | 0-2 | 1.25 |
| Water | 0-2 | 0.25 |

The addition of columbium (as nickel columbium) to the flux is optional. When it is added, the columbium level of the deposit falls within the range specified for INCONEL Welding Electrode 112. However, omission of this flux ingredient causes a reduction in the columbium level of the deposit and significantly increases weld ductility.

Average all-weld-metal room temperature mechanical properties are shown below in Table 5.

TABLE 5

| UTS | 0.2% YS | El (%) | RA (%) | Rockwell Hardness |
|---|---|---|---|---|
| 109.2 ksi (753 MPa) | 77.5 ksi (534 MPa) | 19.1 | 22.9 | 98/100B |

The corrosion properties of the resulting weld were obtained in the following fashion.

A number of 0.25 inch (0.64 cm) thick plates of steel were clad with a single 0.062 inch (0.16 cm) thick layer of INCONEL alloy 625. A variety of gap configurations and a number of weld passes were utilized to make the following specimens. To protect the steel, a backing sheet of INCONEL alloy 625 was applied and the edges were welded.

The various specimens were immersed in a $SO_2$ saturated (pH < 1) 23,750 ppm chloride (as NaCl) solution at 80° C. (176° F.) for 30 days. The testing conditions represent an environment which weldments would reasonably encounter.

Table 6 contains the chemical compositions of the evaluated weld materials. Heats 1,3, and 4 are for purposes of comparison.

ular, pit depths were estimated with a 20× microscope scale.

TABLE 7
Immersion Test Data for INCONEL alloy 625 Clad Steel Plate With Various Welds, Evaluated in $SO_2$ Saturated (pH < 1) 23,750 ppm Chloride (as NaCl) at 80° C. (176° F.) for 30 Days

| Specimen Number | Welding Electrode # (1) | Corrosion Rate (mpy) (2) | Center Weld in Clad | Comment Edge Weld | Cladding |
|---|---|---|---|---|---|
| 1 | 2 | <1 (.03 mm) | NLC (3) | NLC | NLC |
| 2 | 1 | <1 | NLC | NLC | NLC |
| 3 | 1 | <1 | NLC | NLC | 1 pit 1/16" (1.6 mm) deep (4) |
| 4 | 2 | <1 | NLC | NLC | NLC |
| 5 | 1 | 3 (.07 mm) | High pit density up to 1/32" (.8 mm deep) | NLC | NLC |
| 6 | 2 | <1 | NLC | NLC | NLC |
| 7 | 1 | <1 | NLC | NLC | NLC |
| 8 | 2 | <1 | NLC | NLC | NLC |
| 9 | 1 | <1 | NLC | NLC | NLC |
| 10 | 2 | <1 | NLC | NLC | NLC |
| 11 | 3 | <1 | NLC | NLC | NLC |
| 12 | 4 | <1 | NLC | NLC | NLC |

(1) See Table 6, Column 1
(2) mpy = mils (thousandths of an inch) per year
(3) NLC = No Localized Corrosion was clearly discernable.
(4) Adjacent to weld, where a black film from welding was left on the plate.

Specimens 3 and 5 suffered pitting of the backing

TABLE 6

| Welding Electrode | CHEMICAL COMPOSITIONS (in weight %) | | | | | | | | | | | | | | | |
|---|---|---|---|---|---|---|---|---|---|---|---|---|---|---|---|---|
| | C | Mn | Fe | S | Si | Cu | Ni | Cr | Al | Ti | Mg | Co | Mo | Cb + Ta | P | W |
| (1) INCONEL Welding Electrode 112 (Standard) | 0.04 | 0.06 | 3.87 | 0.005 | 0.49 | 0.12 | 61.66 | 21.41 | 0.067 | 0.056 | 0.0015 | 0.062 | 8.81 | 3.53 | 0.007 | — |
| (2) Instant Electrode | 0.04 | 0.04 | 2.49 | 0.004 | 0.48 | 0.12 | 59.68 | 21.72 | 0.047 | 0.044 | 0.0015 | 0.043 | 11.96 | 3.47 | 0.005 | — |
| (3) INCONEL Alloy 625 Filler Metal (bare) | 0.04 | 0.06 | 1.95 | 0.002 | 0.16 | 0.14 | 62.79 | 22.02 | 0.16 | 0.26 | | 0.042 | 0.035 | 9.05 | 3.50 | 0.005 | — |
| (4) HASTELLOY* C-276 Filler Metal (bare) | <0.002 | 0.48 | 6.08 | — | 0.02 | 0.06 | Bal | 15.56 | — | — | — | 1.22 | 15.61 | — | 0.005 | 3.73 |

*Trademark of Cabot Corporation

Table 7 below lists immersion test data.

The specimens were tested as-produced, with the welds having been stainless steel brushed.

The test solution was prepared by dissolving reagent grade sodium chloride into distilled water. The solution was saturated with $SO_2$ gas prior to the start of the test and daily (weekdays) thereafter.

Three specimens each were placed in a TEFLON (Trademark of DuPont, E. I., de Nemours & Co., Inc.) cradle suspended in 4.5 L of corrodent contained in a 5 L resin reaction flask fitted with 12" (30.48 cm) Graham condensers.

After 30 days immersion, specimens were cleaned first with BON AMI (Trademark of Faultless Starch Company) and then with methanol and chlorothene.

Specimens were evaluated in terms of mass loss corrosion rates and examined under 20× magnification for localized corrosion. Pit depths were measured with a depth gauge where possible. Where surfaces were irregplate and/or the cladding where a black film from welding with a coated electrode was not completely removed from the specimen by stainless steel brushing. The ferricyanide test indicated that the black film contained significant iron, which could form ferric chloride adjacent to the surface. This would create a severely aggressive, highly localized environment.

Specimen 5 suffered significant pitting in the center weld in the clad. As this weld was made with a standard electrode deposited directly onto steel, the pitting was as expected. Due to the iron dilution in the weld, the Mo content of the weld surface exposed to the environment may be as low as 6½ to 7%. Specimen 6 was welded similarly and it did not pit.

Specimens 11 and 12, with center welds in the clad of INCONEL Filler Metal 625 and HASTELLOY C-276, respectively, exhibited excellent corrosion resistance. However, these two welding rods are not flux covered and therefore are only useful in situations differing from those contemplated for the instant covered electrode.

Rather, they have been utilized herein for comparison purposes.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A consumable electrode for welding a 625 alloy clad steel workpiece, the electrode including a core wire and a coating, the core wire consisting essentially of about 20% to about 23% chromium, about 8% to about 10% molybdenum, up to about 5% iron, up to about 1% cobalt, up to about 0.5% silicon, up to about 0.4% aluminum, up to about 0.4% titanium, about 3% to about 4% columbium plus tantalum, the balance nickel and trace impurities, and the coating consisting essentially of about 10% to about 40% calcium carbonate, about 10% to about 35% cryolite, about 10% to about 30% titanium dioxide, up to about 10% magnetite, about 6% to about 12% molybdenum, up to about 7% nickel-columbium, up to about 10% chromium, up to about 15% nepheline syenite, up to about 5% zirconium oxide, up to about 5% periclase, up to about 5% extrusion aids, and a binder.

2. The electrode according to claim 1 wherein a resulting weld deposit consists essentially of about 20% to about 23% chromium, about 11% to about 13% molybdenum, up to about 4.2% columbium plus tantalum, up to about 1% manganese, up to about 7% iron, up to about 0.8% silicon, up to about 0.5% copper, the balance nickel and trace elements.

3. The weld deposit according to claim 2 wherein the deposit consists essentially of about 22% chromium, about 12% molybdenum, about 3.5% columbium plus tantalum, about 2.5% iron, about 0.5% silicon, about 0.1% copper, the balance nickel and trace elements.

4. The coating according to claim 1 consisting essentially of about 23% calcium carbonate, about 21% cryolite, about 14% titanium dioxide, about 3% magnetite, about 10% molybdenum, up to about 7% nickel-columbium, about 8% chromium, about 8% nepheline syenite, about 1% zirconium oxide, about 2% periclase, and about 4% extrusion aids.

5. A weld deposit affixed to a nickel-chromium-molybdenum alloy clad steel article, the weld deposit consisting essentially of about 20% to about 23% chromium, about 11% to about 13% molybdenum, up to about 4.2% columbium plus tantalum, up to about 1% manganese, up to about 7% iron, up to about 0.8% silicon, up to about 0.5% copper, the balance nickel and trace elements.

6. A steel workpiece cladded with a nickel-base alloy including a welded deposit affixed to the cladding, the cladding consisting essentially of about 20% to about 23% chromium, about 3% to about 4% columbium plus titanium, about 8% to about 10% molybdenum, up to about 5% iron, up to about 0.5% manganese, up to about 0.4% aluminum, up to about 0.4% titanium, up to about 0.5% silicon, up to about 1% cobalt, the balance nickel and trace elements and the welded deposit consisting essentially of about 20% to about 23% chromium, about 11% to about 13% molybdenum, up to about 4.2% columbium plus tantalum, up to about 1% manganese, up to about 7% iron, up to about 0.8% silicon, up to about 0.5% copper, the balance nickel and trace elements.

* * * * *